June 13, 1950 V. J. HAWKS 2,510,975

TRANSMISSION CONTROL IN TWO-WAY SIGNALING SYSTEMS

Filed Dec. 30, 1948 4 Sheets-Sheet 1

INVENTOR
V. J. HAWKS
BY
Earl C. Laughlin
ATTORNEY

June 13, 1950 V. J. HAWKS 2,510,975

TRANSMISSION CONTROL IN TWO-WAY SIGNALING SYSTEMS

Filed Dec. 30, 1948 4 Sheets-Sheet 2

INVENTOR
V. J. HAWKS
BY Earl C. Laughlin
ATTORNEY

TRANSMISSION CONTROL IN TWO-WAY SIGNALING SYSTEMS

Filed Dec. 30, 1948 4 Sheets-Sheet 3

INVENTOR
V. J. HAWKS
BY
Earl C. Laughlin
ATTORNEY

TRANSMISSION CONTROL IN TWO-WAY SIGNALING SYSTEMS

Filed Dec. 30, 1948 4 Sheets-Sheet 4

INVENTOR
V. J. HAWKS
BY
Earl C. Laughlin
ATTORNEY

Patented June 13, 1950

2,510,975

UNITED STATES PATENT OFFICE 2,510,975

TRANSMISSION CONTROL IN TWO-WAY SIGNALING SYSTEMS

Verl J. Hawks, Mount Vernon, N. Y., assignor to Bell Telephone Laboratories, Incorporated, New York, N. Y., a corporation of New York Application December 30, 1948, Serial No. 68,344

7 Claims. (Cl. 178—44)

Figure 1:
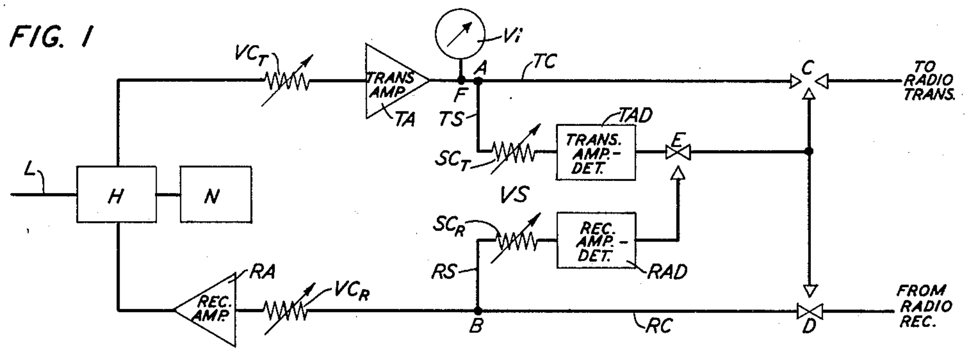

The invention relates to signal wave transmission systems and particularly to a two-way telephone system including an intermediate transmission link subject to varying noise or other interference, such as a radio or carrier link.

The invention is specifically applicable to a control terminal for a carrier or radio telephone system, particularly a point-to-point radio telephone system in which it is used at each end of the radio link therein for controlling speech signal transmission between the radio equipment and the associated two-wire telephone plant. The primary function of the control terminal in such a system is to produce the optimum ratio of useful signal to the noise introduced by the radio link. This purpose is accomplished chiefly by use of speech volume regulation in the two one-way amplifying paths of the terminal respectively outgoing to the radio transmitter and incoming from the radio receiver. Such a terminal may also include a switching device known as a vodas (voice-operated device, antisinging), which is responsive to the voice signals of the telephone subscribers connected over the system to control transmission in the oppositely directed amplifying paths of the terminal in such manner as to suppress signal echoes and to prevent "singing" around the four-wire loop formed by these paths and reradiation of speech signals incoming from the radio receiver, which might arise due to imperfect balance of the hybrid coil arrangements employed in the terminal. To insure proper operation of such a control terminal, arrangements should also be provided therein to enable adjustment of the sensitivities of the transmitting and receiving branches of the vodas from time to time to take account of varying line and radio noise conditions.

In one type of control terminal heretofore used the volume and sensitivity controls comprise separate manually-operated variable attenuators in the signal transmitting and receiving paths and the inputs of the transmitting and receiving vodas branches, respectively, which are independently adjusted by the technical operator from time to time as service conditions vary. A disadvantage of this type of control terminal is the difficulty of determining accurately and quickly the correct adjustment of the variable attenuator in the signal receiving path, which is a function of the settings of the other three variable attenuators. In other prior art control terminals, this disadvantage is overcome by the use of relatively complex and expensive electrically-operated control means automatically responsive to the separate manual adjustments by the technical operator of the variable attenuators in the signal transmitting path and in the inputs of the two vodas branches to provide an adjustment of loss in the signal receiving path which is proportional to the algebraic sum of the effects of the three manual controls.

An object of the invention is to improve a control terminal of the above-described general type from the standpoint of simplification and reduction in the cost of the control equipment.

A related object is to provide with simple and economical equipment, maximum gain in the incoming and outgoing signal transmission paths of a control terminal for a two-way radio or carrier telephone system consistent with the maintenance of antisinging conditions and discrimination against echoes, line noise and other types of interference such as that arising in the radio path of the system.

Another object is to regulate the volume of the speech signals transmitted to and received from the radio link of a two-way radio telephone system by the associated telephone subscribers to the most effective values for the existing service conditions.

Another object is to limit the volume level of speech signals received by a telephone subscriber through a control terminal of a two-way radio telephone system to a maximum value which will not be irritating to the ear of that subscriber.

These objects are attained namely by the provisions of suitable mechanical coupling between variable attenuation means in the signal receiving path of the control terminal and each of the manual controls for the separate manually adjustable variable attenuation means in the signal transmitting path of the terminal and the transmitting and receiving branches of the associated vodas, respectively, so that when the manual controls are independently adjusted by the technical operator to bring the transmitted signal volume level and the sensitivities of the two vodas branches to the required values for proper operation of the terminal under the existing service conditions, the effective loss value of the variable attenuation means in the signal receiving path is automatically adjusted to the optimum value consistent with maintaining satisfactory echo margin in the terminal. In one embodiment of the invention, three separate manually-controlled mechanical multisection switches of the rotary type operated by the technical operator are utilized separately for switching in or out resistance portions of variable resistance attenuators in the signal transmitting path and the transmitting and receiving branches of the vodas, respectively, so as to adjust the transmitted signal volume and the sensitivities of the vodas branches to the optimum values for existing line and radio noise conditions, and for simultaneously controlling the insertion or removal of resistance portions of variable attenuators in the signal receiving path to produce suitable compensating adjustments of loss in the latter path to maintain the required echo margin in the terminal.

A feature of the invention is an auxiliary relay switching arrangement controlled by operation of the manually controlled switches, or separate keying means under control of the technical operator, to switch additional loss into the signal receiving path of the terminal when required to limit the volume of the received speech signals transmitted through the control terminal to the associated telephone system at any time to a maximum value which will not irritate the listening telephone subscriber.

Figures 2, 5:
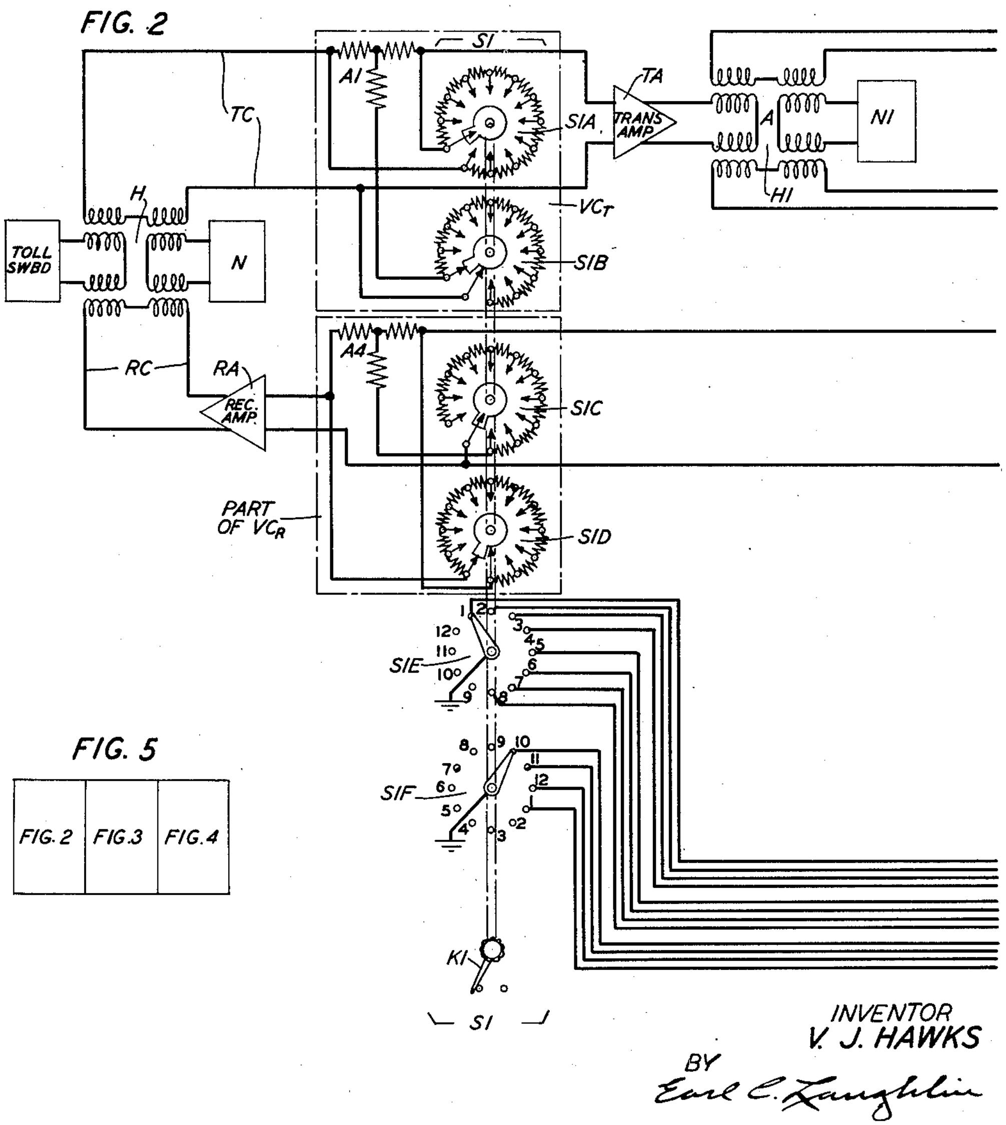
Figure 3:
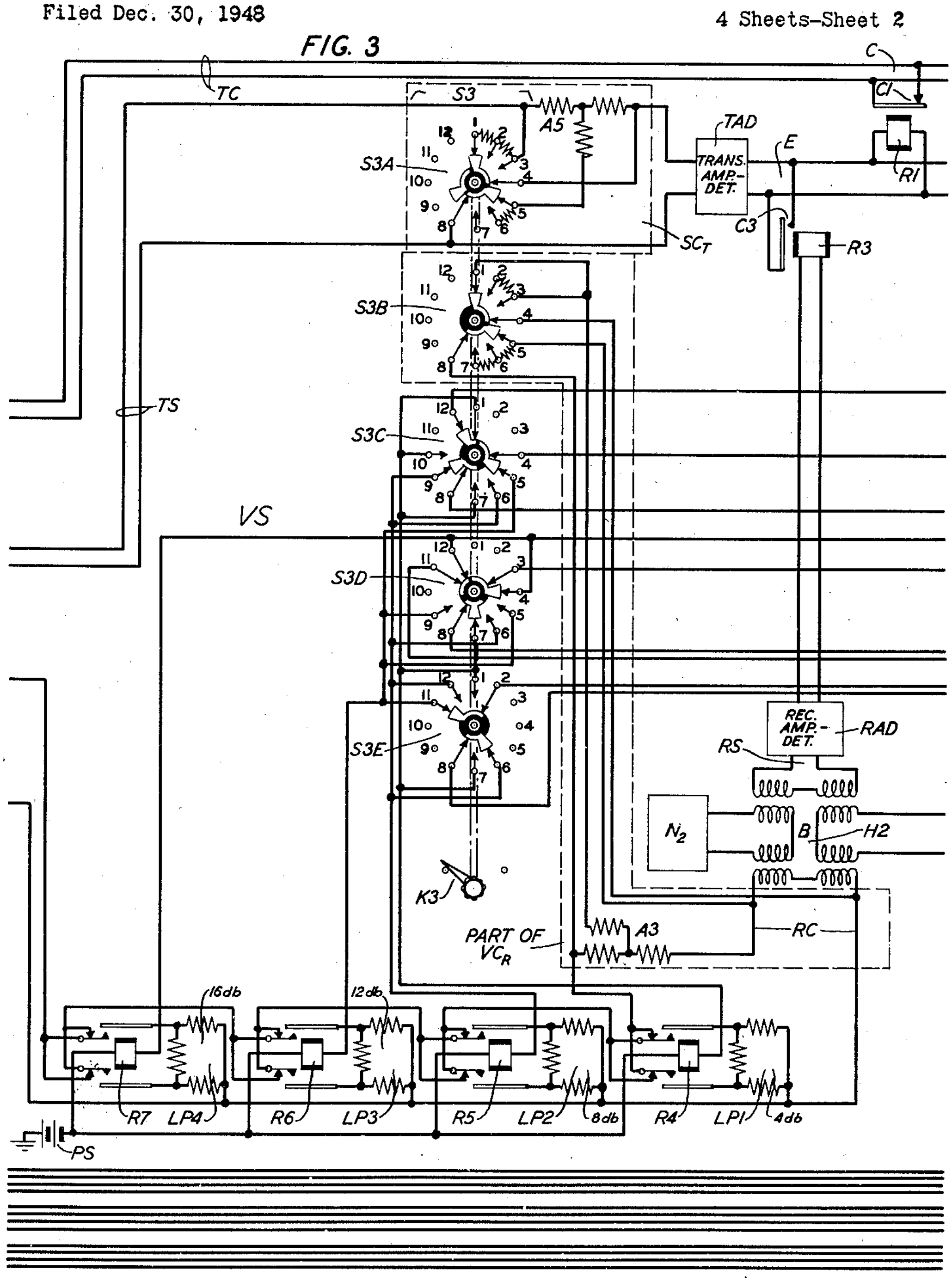
Figure 4:
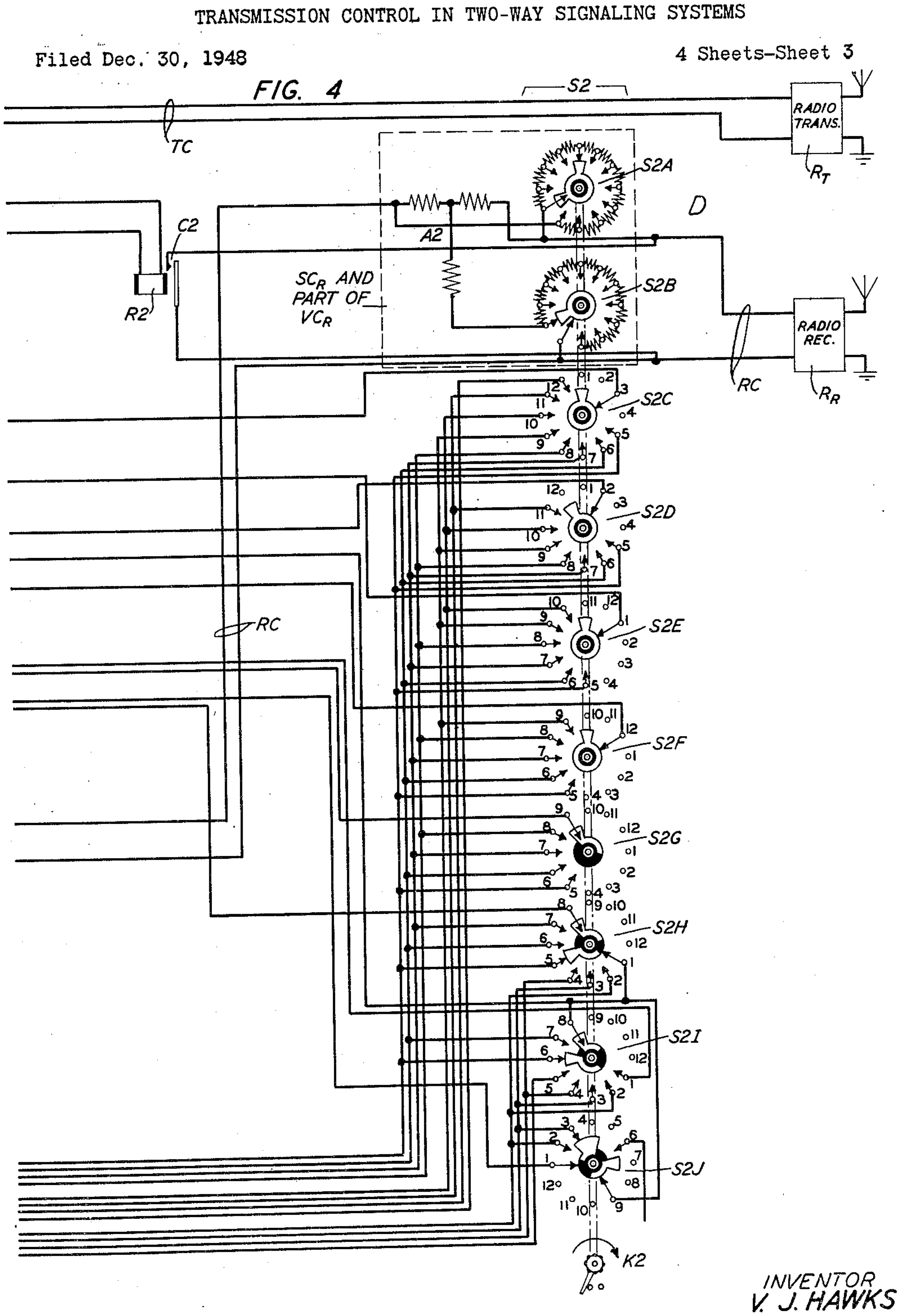
Figure 6A:
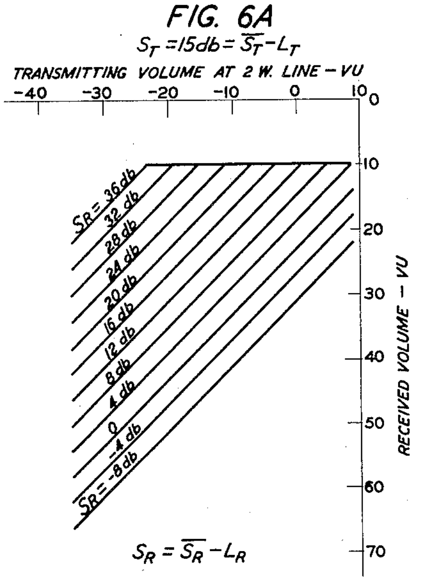
Figure 6B:
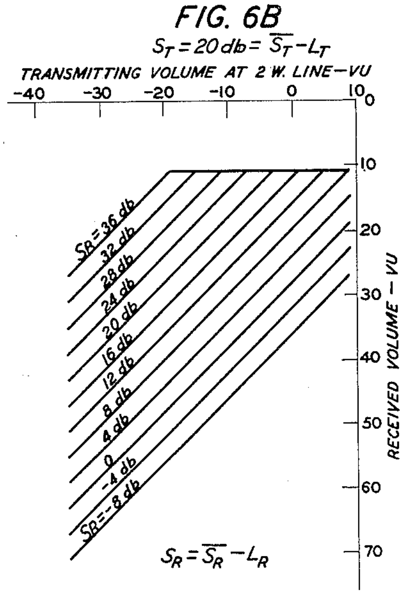
Figure 6C:
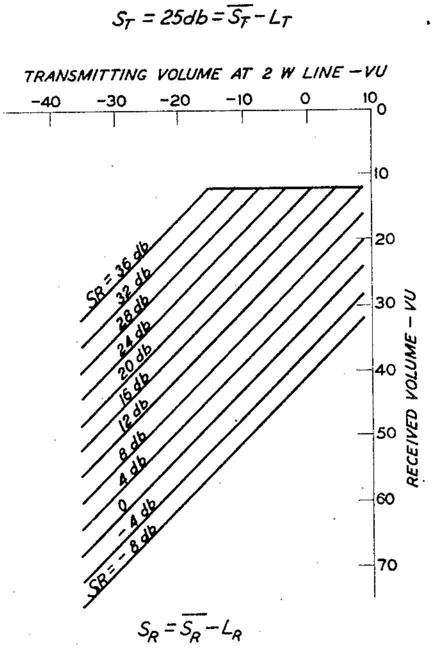

The various objects and features of the invention are explained in more detail in the following complete description thereof to be read in conjunction with the accompanying drawings in which:

Fig. 1 shows a single line functional schematic of a radio telephone control terminal of the general type to which the invention is applicable;

Figs. 2, 3 and 4 in combination show schematically such a control terminal equipped with control circuits and apparatus embodying the invention;

Fig. 5 illustrates how the circuits of Figs. 2, 3 and 4 should be combined to form a control terminal embodying the invention; and Fig. 6 (*a*), (*b*) and (*c*) show curves illustrating the performance of a control terminal in accordance with the invention. In the functional schematic of Fig. 1, each single line represents a two-wire transmission path, and the transmission apparatus associated with each two-wire transmission path are represented by suitable labeled boxes or representations of their functions. Contacting arrowheads in a transmission path indicate that the path at that point is normally made or enabled, and separated arrowheads in a transmission path indicate that the path at that point is normally broken or disabled. An arrow directed at a make point (contacting arrowheads) in a transmission path from a box indicates that the path will be disabled by operation of the apparatus represented by the box, and an arrow directed toward a break point (separated arrowheads) in a transmission path from a box indicates that the path will be enabled by operation of the apparatus represented by the box.

The control terminal of Fig. 1 is essentially a four-wire terminating circuit for a radio telephone system. As indicated, this four-wire circuit comprises a transmitting circuit TC leading to a radio transmitter and a receiving circuit RC leading from a radio receiver. The input of the circuit TC and the output of the circuit RC are connected in substantially conjugate relation with each other and in energy transmitting relation with the two-way circuit or line L by a hybrid coil H and associated balancing network N in well-known manner. The two-way circuit or line L may connect to a telephone switchboard in a normal two-wire telephone plant (not shown). The transmitting circuit includes in its input a transmitting volume control $VC_T$, shown as a variable resistance attenuator, and the transmitting amplifier TA. The receiving circuit RC includes the receiving volume control $VC_R$, shown as a variable resistance attenuator, and the receiving amplifier RA. Associated with the four-wire circuit is a voice-operated swtiching device or vodas VS for suppressing echoes and preventing singing, including a transmitting branch TS having its input connected across the transmitting circuit TC at the point A in the output of the transmitting amplifier TA and a receiving branch RS having its input connected across the receiving circuit RC at a point B in front of the receiving amplifier RA. The transmitting branch TS of the vodas VS includes the transmitting amplifier-detector TAD and the sensitivity control $SC_T$ therefor which may be a variable resistance attenuator, as shown, in the input of the branch TS, and the receiving branch RS includes the receiving amplifier-detector RAD and the sensitivity control $SC_R$ therefor, which may be a variable resistance attenuator, as shown, in the input of the branch RS.

In the absence of outgoing speech signals received from the two-way line L, the transmitting circuit TC is disabled or blocked at the point C beyond the point of connection of the transmitting branch TS of the vodas thereto, as indicated by the separated arrowheads at that point, and the receiving circuit RC is normally operative to transmit speech signals incoming from the radio receiver to the receiving amplifier RA and to the receiving branch RS of the vodas VS as indicated by the contacting arrowheads at the point D in the input of the receiving circuit RC. Outgoing speech signals received over the two-way line L from a telephone subscriber will be impressed by the hybrid coil H on the input of the transmitting circuit TC and will pass out through the transmitting volume control $VC_T$ and the transmitting amplifier TA towards the radio transmitter. The portion of these outgoing signals diverted at the point A into the transmitting branch TS of the vodas will pass through the sensitivity control $SC_T$ to the transmitting amplifier-detector TAD in which they will be amplified and rectified, and the rectified speech signal energy in the output of the transmitting amplifier-detector TAD will cause the transmitting circuit TC to be rendered operative or enabled at the point C and the receiving circuit RC to be blocked or disabled at the point D. This will permit the outgoing speech signals in the circuit TC to be transmitted with the amplification provided by the transmitting amplifier TA to the radio transmitter for radiation therefrom and, while the circuit RC is maintained disabled by operation of the transmitting amplifier-detector TAD, will prevent speech signals or noise energy thereafter received over the circuit RC from the radio receiver from entering the receiving vodas branch RS or being fed back through the hybrid coil H and the transmitting circuit TC to cause false operation of the transmitting vodas branch TS, or to set up a singing condition around the four-wire circuit.

If speech signals are received over the circuit RC from the radio receiver during a time interval in which that circuit is held enabled at the point D due to non-operation at that time of the transmitting vodas branch TS by outgoing speech signals, the main portion of these signals after amplification by the receiving amplifier RA will be passed out from the output of the circuit RC through the hybrid coil H to the two-way line L and will be transmitted from that line to the listening telephone subscriber's line connected thereto through the associated telephone switchboard. Another portion of the received speech signals will be diverted from the receiving circuit RC at the point B into the receiving vodas branch RS and will be amplified and rectified in the receiving amplifier-detector RAD. The rectified signal output of the latter will cause the transmitting vodas branch to be disabled at the point E in its output. Thus, while RAD remains operated by the applied received speech signals, subsequent operation of the transmitting amplifier-detector TAD by outgoing speech signals received from the line L or from echoes of speech signals incoming from the radio receiver passing through the hybrid coil H to the transmitting circuit TC, due to the break in TS at point E, cannot result in the disabling of the receiving circuit RC at the point D to cut off the received signals, or the enabling of the transmitting circuit TC at the point C to permit the outgoing signals or echoes to pass to the radio transmitter.

Proper operation of such a control terminal under all service conditions requires suitable adjustment from time to time of the transmitting volume control $VC_T$ in the transmitting circuit TC, the receiving volume control $VC_R$ in the receiving circuit RC, the transmitting sensitivity control $SC_T$ in the input of transmitting vodas branch TS and the receiving sensitivity control $SC_R$ in the input of the receiving vodas branch RS. The function of each of these controls will now be described.

The transmitting volume control $VC_T$ is provided to enable adjustment of the signal input to the radio transmitter to a relatively constant volume in order to fully load the transmitter for all subscribers without producing excessive distortion regardless of whether the talker's speech is "strong" or "weak" and whether the connecting land line to the talker's station is long or short, and to maintain the highest signal-to-noise ratio for the radio portion of the circuit. Frequent adjustment of this control is required during a conversation. If the volume of the local subscriber's speech is a maximum, this control can be set so as to provide a maximum value of loss which is the most favorable condition for delivering high volume from the radio receiver to the local telephone subscriber. This control is adjusted throughout a conversation by the technical operator so as to maintain a normal reading on a volume indicator VI connected across the circuit TC at the point F.

The transmitting sensitivity control $SC_T$ is adjusted not oftener than once for each conversation, to maintain the sensitivity of the amplifier-detector in the transmitting branch of the vodas as high as is practical without false operation from land line noise. Before a subscriber is connected to the control terminal, this sensitivity should be nominal. After a connection is made, this sensitivity may need to be decreased because of noise from the land line circuit or it may need to be increased because the characteristics of the subscriber's speech are such as to result in excessive clipping of the initial parts of words. Obviously, the latter cannot be done if the line noise is excessive. Readjustment of this control will require a change in the adjustment of the receiving volume control $VC_R$ in order to maintain echo margin as will be described.

The receiving sensitivity control $SC_R$ may be adjusted without a subscriber's connection to the terminal and its adjustment should be such that it provides as low a loss (high sensitivity) as can be obtained without operation of the amplifier-detector in the receiving branch of the vodas by noise from the radio receiver. This is necessary to insure that the highest permissible receiving volume is delivered to the local subscriber for any particular setting of the transmitting volume control $VC_T$ and the transmitting sensitivity control $SC_T$. The correct adjustment of the receiving sensitivity control $SC_R$ is determined by the technical operator by monitoring and by observing a lamp (not shown) which is lighted up by the operation of the receiving amplifier-detector RAD.

The adjustment of the receiving volume control $VC_R$ depends on the setting of the other three controls. The minimum loss required by it can easily by calculated from the following echo margin formula:

Echo margin $= S_R - S_T + L_T + L_R - G_T - G_R + R_L +$ 12 decibels (1) where:

$S_R$ = the sensitivity of the radio amplifier-detector RAD as measured from the point B;

$S_T$ = the sensitivity of the transmitting amplifier-detector TAD as measured from the point A;

$L_T$ = the loss in the transmitting volume control $VC_T$;

$L_R$ = the loss in the receiving volume control $VC_R$;

$G_T$ and $G_R$ are the gains provided in the four-wire circuit by the transmitting amplifier TA and the receiving amplifier RA, respectively;

$R_L$ = the return loss of the two-wire line L against the hybrid coil H and associated line balancing network N.

Echo margin, amounting to perhaps 3 to 5 decibels, is required in the control terminal to prevent false operation of the transmitting amplifier-detector TAD by echoes of incoming speech currents from the radio receiver transmitted through the hybrid coil H to the transmitting circuit TC, before the receiving amplifier-detector RAD has been operated by the direct speech currents. If the transmission to the receiving amplifier-detector RAD is slightly better than it is to the transmitting amplifier-detector TAD as regard sensitivity, gain-frequency characteristics and speed, the receiving amplifier-detector RAD will operate first and thus will prevent the operation of the transmitting amplifier-detector TAD in response to the same speech currents from cutting off desired speech. The above formula merely gives a measure of echo margin in terms of sensitivity since the other differences can be made relatively small. It is obvious from the above formula, that, as $L_T$ and the loss provided by the transmitting sensitivity control $SC_T$ are increased and the loss provided by the receiving sensitivity control $SC_R$ is decreased, the echo margin will be increased. This will permit the loss $L_R$ of the receiving volume control $VC_R$ to be decreased until the echo margin requirement is just met, and the receiving volume will be increased by an equal amount.

The adjustment of three of the above controls, i. e., the transmitting volume control $VC_T$, transmitting sensitivity control $SC_T$ and the receiving sensitivity control $SC_R$, is quite specific and is dependent on factors within the power of the technical operator to control. The adjustment of the receiving volume control $VC_R$, however, is dependent upon the adjustments of the other three controls. In addition to the need for meeting the echo margin requirements discussed above, the loss in the receiving circuit RC should be adjusted so that the volume of the received signal energy sent into the two-wire line L is not so high as to irritate the ear of the listening subscriber connected to the terminal through that line. For example, under conditions of high transmitting volume, low transmitting sensitivity and high receiving sensitivity, it would be possible while meeting the echo margin requirements to deliver volumes exceeding +10VU. It is obvious from the general description above, that the correct adjustment of the receiving volume control $VC_R$ to meet both of these requirements is not simple. It may require either an operation test by the technical operator during a call to determine whether echo margin is provided, a lengthy calculation or an adjustment such as to provide unnecessarily low volumes for the received signal energy all of which are undesirable.

A simple and economical arrangement in accordance with the invention for automatically setting up the desired loss in the receiving circuit of such a control terminal to meet both of the above requirements is illustrated in Figs. 2, 3 and 4.

Figs. 2, 3 and 4 when placed side by side, in the order indicated in Fig. 5, show schematically a radio control terminal, such as illustrated diagrammatically in Fig. 1, with certain of the transmission apparatus and circuits in accordance with a preferred form of the invention shown in detail. The elements of the control terminal of Figs. 2, 3 and 4 corresponding to the same elements in the more diagrammatic showing of the terminal in Fig. 1 are designated by the same identification characters.

The transmitting circuit TC of the control terminal of Figs. 2, 3 and 4 includes in order, reading from left to right, between the hybrid coil H and the radio transmitter RT, the manually-controlled variable resistance attenuator A1 for controlling the transmitted signal volume; the transmitting amplifier TA; a hybrid coil H1 with an associated line balancing network N1; and the normally closed short circuiting connection C1 across the circuit at the point C, such as to effectively disable the circuit at that point. The receiving circuit RC of the control terminal of Figs. 2, 3 and 4 includes in order, reading from right to left, between the radio receiver RR and the hybrid coil H; a normally open short circuiting connection C2 across the circuit RC at the point D which when closed is such as to effectively disable the circuit at that point; a second manually-controlled variable resistance attenuator A2 for effectively controlling the sensitivity of the receiving branch RS of the vodas VS and for providing partial control of the received signal volume; the hybrid coil H2 with an associated line balancing network N2, at the point B; the variable resistance attenuator A3 and the variable resistance attenuator A4 in tandem, for providing partial control of the received signal volume; and the receiving amplifier RA.

The transmitting branch TS of the vodas VS has its input connected across the circuit TC at the point A by means of the hybrid coil H1 and associated line balancing network N1, in receiving relation with respect to the output of the transmitting amplifier TA and in conjugate relation with respect to the outgoing portion of the circuit TC leading to the radio transmitter RT. The transmitting vodas branch TS includes the manually-controlled variable resistance attenuator A5 in its input; the following transmitting amplifier-detector TAD; and the switching relays R1 and R2 respectively responsive to the rectified output of TAD when a portion of the outgoing signals in the circuit TC is applied to the input thereof, to open the short circuiting connection C1 at the point C in the transmitting circuit TC and thus render that circuit operative to transmit the outgoing speech signals amplified by the transmitting amplifier TA to the radio transmitter RT, and to simultaneously close the short circuiting connection C2 across the receiving circuit RC at the point D to disable the latter circuit at that point.

The receiving vodas branch RS has its input connected by means of the hybrid coil H2 and associated balancing network N2 across the receiving circuit RC at the point B in receiving relation with respect to the portion of that circuit incoming from the radio receiver RR and in conjugate relation with respect to the outgoing portion of that circuit leading to the input of the receiving amplifier RA. The receiving vodas branch RS includes the receiving amplifier-detector RAD and the switching relay R3 responsive to the rectified output of the latter when voice signals are applied to its input from the receiving circuit RC, to close the normally open short circuiting connection C3 across the output of the transmitting vodas branch TS at the point E between the output of TAD and the switching relays R1 and R2 so as to prevent operation of the latter to reverse the direction of transmission in the four-wire circuit during the intervals while the receiving amplifier-detector RAD remains operated.

The control terminal also includes a plurality of resistance loss pads LP1, LP2, LP3, LP4 . . . which may be, for example, of values 4 decibels, 8 decibels, 12 decibels and 16 decibels . . . , respectively, each of which is adapted to be inserted in the receiving circuit RC by operation of an associated relay R4, R5, R6, R7 . . . , respectively, when an energized circuit is closed for each relay from the power supply PS, which may be a battery, by operation of the switches S1, S2 and S3 described below to certain contacts thereof so as to limit the volume of the received signals delivered to a listening subscriber to a tolerable value for listener comfort in case the adjustment of these switches results in the receiving volume being increased above the tolerable value, as will be described later.

Each of the attenuators A1 to A5 is of the bridged T-type, the loss value of which in the circuit in which it is connected is adapted to be changed in steps by the simultaneous cutting in or out of resistance in its series and shunt arms by the adjustment of associated sections of a manually-controlled switch, the resistance steps and the range of resistance adjustment on these attenuators being respectively equal. Three manually-controlled, multisection switches of the rotary type, S1, S2 and S3, are provided for this purpose. The several sections on each switch are mounted on a common shaft and interlocked so that they may be simultaneously stepped to corresponding contact positions. Each switch section includes a circular row of twelve contacts and one or two individual switch arms rotatable successively over these switch contacts in either direction to cut in or out steps of resistance in the associated variable attenuator.

The attenuator A1 located in the input of the transmitting circuit TC and the associated sections S1A and S1B of switch S1 for respectively controlling the amount of resistance in the series and shunt arms of that attenuator constitute the transmitting volume control $VC_T$. The attenuator A2 located in the input of receiving circuit RC in front of the point B, and the associated sections S2A and S2B of the switch S2, for respectively controlling the amount of resistance in the series and shunt arms of that attenuator, constitute the receiving sensitivity control $SC_R$. The attenuator A3 located in the input of the vodas transmitting branch TS and the associated section S3A of switch S3, different sets of contacts of which respectively control the amount of resistance in the series and shunt arms of that attenuator, constitute the transmitting sensitivity control $SC_T$. The attenuator A3 and the associated section S3B of the switch S3, different sets of contacts of which respectively control the amount of loss in the series and shunt arms of that attenuator, the attenuator A4 and the associated sections S1C and S1D of switch S1, respectively controlling the amount of resistance in the series and shunt arms of that attenuator, and the attenuator A2 and the associated section S2A and S2B of switch S2, respectively controlling the amount of resistance in the series and shunt arms of that attenuator, in combination operate as the receiving volume control $VC_R$.

To meet echo margin requirements, compensating losses must be cut in or out of the receiving circuit RC of the control terminal to offset decreases or increases of loss manually produced in the transmitting circuit TC and the vodas transmitting branch TS of the terminal by the technical operator to respectively bring the transmitted signal volume and the transmitting vodas sensitivity to the optimum values for the existing service conditions. To enable this to be accomplished, the switching contacts of the sections S1C and S1D of the manually-controlled switch S1 are associated with the variable resistance portions of the attenuator A4 in the receiving circuit RC in reverse manner to that in which the corresponding switching contacts of sections S1A and S1B, respectively, are associated with the variable resistance portions of the attenuator A1 in the transmitting circuit TC, and the switching contacts of section S3B of switch S3 are associated with the variable resistance portions of the attenuator A3 in the receiving circuit RC in the reverse manner to that in which the switching contacts of section S3A of switch S3 are associated with the variable resistance portions of the attenuator A5 in the vodas transmitting branch TS.

Thus, when the technical operator wishes to increase the transmitted signal volume, he will turn the common knob K1 of the switch S1 in the clockwise direction to advance the switch arms of switch sections S1A and S1B in the same direction to the switching contacts which will cause the proper amount of resistance to be cut out of the arms of the attenuator A1 to reduce the loss of the latter the necessary amount. Simultaneously the switch arms of switch section S1C and S1D on the same shaft will be automatically turned to corresponding contacts thereon causing a corresponding amount of resistance to be inserted in the arms of attenuator A4 to increase the loss in the receiving circuit RC by an equal amount to preserve echo margin. Also, when the technical operator wishes to increase the sensitivity of the vodas transmitting branch TS by a given amount because of a reduction in the existing line noise at the terminal, he will turn the common knob K3 of switch S3 clockwise to advance the switch arms of section S3A of switch S3 in the same direction to the proper switching contacts to cause the required amount of resistance to be removed from the arms of the attenuator A5 in the vodas transmitting branch TS thus reducing the loss of the attenuator correspondingly. Simultaneously the switch arm of the section S3B on the same shaft will be automatically turned to corresponding contacts causing an equal amount of resistance to be inserted into the arms of the attenuator A3 in the receiving circuit RC to increase the loss therein by an equal amount, so that echo margin will be maintained for this switch adjustment.

Similarly, the manual operation of the common knob K1 on switch S1 by the technical operator in the counterclockwise direction to increase the loss of attenuator A1 and thus reduce the transmitted signal volume will result in the loss of the attenuator A4 in the receiving circuit RC being automatically reduced by the same amount, and the manual operation of common knob K3 on switch S3 by the technical operator to increase the loss in the attenuator A5 and thus reduce the sensitivity of the vodas transmitting branch TS by a desired amount to prevent false operation thereof on an increase in line noise, will automatically produce a corresponding reduction in the loss of attenuator A3 in the receiving circuit RC, so as to maintain echo margin for each adjustment.

Since an increase in receiving sensitivity will permit an increase in received volume, as determined by echo margin requirements, the single attenuator A2 located in the input of the receiving circuit RS in front of the point of connection of the vodas receiving branch RS thereto may be used to provide the necessary control for receiving sensitivity. When the technical operator turns the common knob K2 of switch S2 clockwise so as to cause the switch arms of sections S2A and S2B of switch S2 to advance in the same direction over the switching contacts resistance will be switched into the arms of that attenuator so that its loss will increase with a consequent reduction in receiving sensitivity, and operation of the knob K2 in the opposite direction will cause resistance to be switched out of the arms of attenuator A2 to reduce its loss and thus increase the receiving sensitivity.

In a practical set-up of the control terminal of the invention as shown in Figs. 2, 3 and 4, which was built and tested, the attenuator A1 in the transmitting volume control $VC_T$ comprised two 44-decibed attenuators provided to handle an input volume, at the two-wire line L, of between +9 and −35 VU. The attenuator A5 in the transmitting sensitivity control $SC_1$ comprised two attenuators each providing losses of 0, 5 and 10 decibels for different switch contact positions. The attenuator A2 common to the receiving sensitivity control $SC_R$ and the receiving volume control $VC_R$ consisted of a single attenuator of 44-decibels range. The attenuator A4 and the attenuator A3 in the receiving volume control $VC_R$ were equivalent to the attenuator A1 in the transmitting volume control $VC_T$ and the attenuator A5 in the transmitting sensitivity control $SC_T$, respectively. Some of the sections of each of the three switches S1, S2 and S3 determine when one or more of the relay-controlled volume limiting pads LP1, LP2 . . . are to be introduced in the receiving circuit RC of the terminal. The following table gives the values of pads required for particular settings of the three controls. It will be noted that the maximum pad loss required is 28 decibels, and that the pads required for transmitting volume control ($VC_T$) settings 40 and 44 decibels are identical. This merely results in a maximum output volume for these unusual combinations which is 4 decibels higher on the 44-decibel step than the maximum volume provided with the 40-decibel step case.

| Loss Inserted By Trans. Vol. Cont. ($VC_T$), Db | Loss Inserted By Rec. Sens. Cont. ($SC_R$), Db | Loss Inserted By Trans. Sens. Cont., Db | Loss Required In Volume Limiting Pads, Db | | |
|---|---|---|---|---|---|
| 0-12 | 0 | | 0 | 0 | 0 |
| 16 | 0 | | 0 | 0 | 4 |
| 20 | 0 | | 0 | 4 | 8 |
| 24 | 0 | | 4 | 8 | 12 |
| | 4 | | 0 | 4 | 8 |
| | 8 | | 0 | 4 | 8 |
| | 12 | | 0 | 0 | 0 |
| 28 | 0 | | 8 | 12 | 16 |
| | 4 | | 4 | 8 | 12 |
| | 8 | | 0 | 4 | 8 |
| | 12 | | 0 | 0 | 4 |
| 32 | 0 | | 12 | 16 | 20 |
| | 4 | | 8 | 12 | 16 |
| | 8 | | 4 | 8 | 12 |
| | 12 | | 0 | 4 | 8 |
| | 16 | | 0 | 0 | 4 |
| 36 | 0 | 0 | 16 | 20 | 24 |
| | 4 | | 12 | 16 | 20 |
| | 8 | | 8 | 12 | 16 |
| | 12 | 5 | 4 | 8 | 12 |
| | 16 | | 0 | 4 | 8 |
| | 20 | | 0 | 0 | 4 |
| 40 | 0 | | 20 | 24 | 28 |
| | 4 | | 16 | 20 | 24 |
| | 8 | | 12 | 16 | 20 |
| | 12 | | 8 | 12 | 16 |
| | 16 | | 4 | 8 | 12 |
| | 20 | | 0 | 4 | 8 |
| | 24 | | 0 | 0 | 4 |
| 44 | 0 | | 20 | 24 | 28 |
| | 4 | | 20 | 24 | 28 |
| | 8 | | 16 | 20 | 24 |
| | 12 | | 12 | 16 | 20 |
| | 16 | | 8 | 12 | 16 |
| | 20 | | 4 | 8 | 12 |
| | 24 | | 0 | 4 | 8 |
| | 24 | | 0 | 0 | 4 |

To describe the operation of the volume limiting portion of the circuit let it be assumed, as in the table, the following switch settings:

| | Decibels |
|---|---|
| Trans. vol. cont. ($VC_T$) | 36 |
| Rec. sens. cont. ($SC_R$) | 12 |
| Trans. sens. cont. ($SC_T$) | 5 |

Under these conditions, the common knobs K1, K2 and K3 of switches S1, S2 and S3 are turned by the technical operator to move the individual switch arms of these switches two, eight and one contact positions, respectively, in a clockwise direction from those shown. This will close an energizing circuit for relay R5 which may be traced from ground through terminal 3 of section S1E of switch S1 ($VC_T$), terminal 7 of section S2E of switch S2 ($SC_R$) and terminal 6 of section S3C of switch S3 ($SC_T$), winding of relay R5 to power supply (battery) PS to ground, causing the operation of that relay to connect the loss pad LP2 (8 decibels) into the receiving circuit RC so as to cut down the received signal volume transmitted to the local listening subscriber connected to the line L by 8 decibels and thus to limit the volume to a tolerable value. To take a slightly more complicated condition, involving the operation of two relays, assume the following switch settings:

| | Decibels |
|---|---|
| Trans. vol. cont. ($VC_T$) | 36 |
| Rec. sens. cont. ($SC_R$) | 0 |
| Trans. sens. cont. ($SC_T$) | 0 |

The common knobs K1, K2 and K3 of switches S1, S2 and S3 are turned by the technical operator to move the individual switch arms of these switches two, eight and two contact positions respectively, in a clockwise direction from those shown. This closes energizing circuits for relays R7 and R6 which may be respectively traced from ground through terminal 3 of section S1E of switch S1 ($VC_T$), terminal 7 of section S2E of switch S3 ($SC_T$), terminal 7 of section S3C of switch S3, winding of relay R7, battery PS to ground, and from ground through terminal 1 of section S1F of switch S1 ($VC_T$), terminal 5 of section S2I of switch S2 ($SC_R$), terminal 9 of section S3D of switch S3 ($SC_T$), winding of relay R6 and battery PS to gound. The relays R7 and R6 will then operate to respectively connect the loss pad LP4 (16 decibels) and loss pad LP4 (12 decibels), or a total loss of 28 decibels, into the receiving circuit RC, so as to cut down the receiving signal volume supplied over line L to the local listening subscriber by that amount, which will bring it to a tolerable value. Other control settings may be assumed with similar results.

The receiving volumes delivered to the two-wire line L over the operating range of input volume to the transmitting circuit TC of the control terminal, for three transmitting amplifier-detector (vodas transmitting branch) sensitivities of 15, 20 and 25 decibels and receiving amplifier-detector (receiving vodas branch) sensitivities between 36 and −8 decibels, are given graphically in Fig. 6 (*a*), (*b*) and (*c*). Over the range covered by the 45 degree lines, the received volumes are limited by echo margin. In the range covered by the horizontal lines, the received volume is limited by the volume limiting controls. As an example, assume a transmitting sensitivity of 20 decibels (5 decibels in the attenuator A1 of the transmitting sensitivity control $SC_T$) as limited by line noise, a receiving sensitivity of −8 decibels (44 decibels in the attenuator A2 of the receiving sensitivity control $SC_R$) as limited by radio noise and an input volume of −18 VU. Under these conditions, the received volume will be −54 VU. The received volume in this case is limited entirely by echo margin. Assume the same operating conditions again except for an increase in the receiving sensitivity to 36 decibels (0 decibels in the attenuator A2 of the receiving sensitivity control $SC_R$). The received volume in this case is −11 decibels and is limited entirely by the volume limiting portion of the circuit. Other values of receiving sensitivity may be assumed and the received volume readily determined by the curves of Fig. 6 (*a*), (*b*) and (*c*).

Separate manual means such as one or more key-controlled variable loss pads in the receiving circuit RC for limiting the volume level of the received signals transmitted to a listening subscriber to a maximum value which will not be irritating to his ear may be employed in place of the particular relay volume limiting arrangement interlocked with the manual switches illustrated and described. In that case a volume indicator or a monitoring telephone set connected across the receiving circuit RC may be employed by the technical operator to determine if the received volume for any service condition exceeds the tolerable value. Various other modifications of the control terminal arrangements illustrated and described which are within the spirit and scope of the invention will occur to persons skilled in the art.

What is claimed is:

1. In combination with a two-way communication system including an intermediate two-way transmission link, a two-way line section and a four-wire control terminal connected therebetween, comprising one two-wire path for transmitting outgoing communication signals received over said line section to said intermediate transmission link, a second two-wire path for transmitting communication signals incoming over said intermediate link to said two-way line section and a switching circuit comprising a transmitting branch responsive to the outgoing signals in said one path, in the absence of prior incoming signals in said second path, to disable said second path and a receiving branch responsive to incoming signals in said second path, in the absence of prior outgoing signals in said one path to disable said one path, so as to suppress signal echoes and prevent singing in said control terminal: means to insure proper operation of said control terminal over a wide range of service conditions, including separate manually-controlled variable attenuators in said one path, in the input of the transmitting switching branch and in the input of the receiving switching branch, respectively, for respectively independently adjusting the out-going signal volume level and the sensitivities of said transmitting and receiving switching branches and variable attenuation means in said second path effectively mechanically coupled to each of said manually-controlled variable attenuators in such manner that any manual adjustment of the latter will automatically result in compensating adjustments of the variable attenuation means in said second path to the proper loss value from the standpoint of preserving a satisfactory echo margin in said control terminal.

2. In combination with a telephone system including an intermediate radio link, a two-way line connectable to the subscriber stations of an associated voice frequency telephone network, and a four-wire control terminal therebetween including one two-wire amplifying path for repeating outgoing telephone signals received over said line section from any subscriber station in the associated telephone network to said radio link for radiation thereby, a second two-wire amplifying path for repeating telephone signals incoming over said radio link to said line section for transmission to a subscriber station in the associated telephone network and a vodas switching circuit comprising a transmitting branch responsive to the outgoing telephone signals in said one path and a receiving branch responsive to the incoming telephone signals in said second path, for directionally controlling signal transmission while suppressing signal echoes and preventing singing in said terminal: means for insuring proper operation of said control terminal over a wide range of line or radio noise conditions encountered in service including separate variable attenuators in said one path, in the input of the vodas transmitting branch and in the input of the vodas receiving branch, respectively, manual controls for each of said variable attenuators operable by the technical operator of the control terminal to produce independent adjustment of the outgoing signal volume level and the sensitivities of the vodas transmitting and receiving branches to the optimum values for any existing service condition in said range and variable attenuation means in said second path so mechanically interlocked with each of the manual controls for said variable attenuators, that any manual adjustment of said controls will automatically result in a suitable compensating adjustment of attenuation in said second path to maintain satisfactory echo margin in said terminal.

3. The combination of claim 1, in which said two-way line section is adapted for connection to one or more subscriber two-way communication stations in an associated signal communication system and said means for insuring proper operation of said control terminal includes means for inserting additional attenuation in said second path when required to limit the volume of incoming communication signals supplied thereby through said two-way line section to a subscriber station to a maximum value tolerable to the subscriber at that station.

4. The combination of claim 2, in which said control terminal includes means under control of the technical operator thereof for inserting an additional amount of attenuation into said second path when the volume level of the signals supplied from the output thereof to a subscriber station exceeds a tolerable value.

5. The combination of claim 2, in which said control terminal includes a plurality of loss pads of different predetermined values and switching means under control of the technical operator at the terminal for inserting one or more of said pads into said second path to suitably increase the attenuation therein so as to limit the volume level of the signals supplied from the output of said second path to a subscriber station to a predetermined maximum value tolerable to the ear of the listening subscriber.

6. The combination of claim 2, in which the manual control for each of said variable attenuators comprises one or more sections of a different manually-controlled mechanical switch having a common control arm, said one or more switch sections of each switch being associated with the controlled variable attenuator in such manner that the operation of the common control arm in one direction by the technical operator will cause the loss value of the controlled attenuator to be increased and operation of the common control arm in the other direction will cause the loss value of the controlled attenuator to be decreased, and the variable attenuation means in said second path is mechanically coupled to other sections of the three manually controlled switches in such manner that when the common control arms of the controlling switches are operated so as to cause the loss value of the variable attenuator in said one path or of the variable attenuator in the input of said vodas transmitting branch to be increased or decreased the loss value of the variable attenuation means in said second path will be decreased or increased, respectively, by the same amount, and the other variable attenuator is located in common to the input of the vodas receiving branch and said second path so when the common control arm of the third switch is operated by the technical operator so as to increase or decrease the loss value of that attenuator the loss value of the variable attenuation means in said second path will be automatically increased or decreased, respectively, by the same amount.

7. The combination of claim 2, in which said variable attenuators and said variable attenuation means are of the variable resistance type, the manual control for each variable attenuator comprises certain sections of a different manually-controlled multisection switch each section of which comprises a similar row of contacts and one or more individual switch arms movable thereover in either direction, each of said switches includes a common control for all sections thereof, the several sections of each switch being mounted in interlocked relation on a common shaft so that their switch arms may be moved simultaneously to corresponding contact positions by the movement of the common control arm of that switch by the technical operator, the contacts of said certain sections of each switch being associated with different resistance portions of the controlled variable attenuator so that when the individual switch arms of these sections are moved in one direction over the successive contacts thereof the amount of resistance in that attenuator is changed so as to increase its insertion loss value and when the individual switch arms of these sections are moved in the other direction over the successive contacts thereof the resistance in the controlled attenuator is changed so as to increase its insertion loss value, the contacts of other sections of the switch controlling the variable atteunator in said one path and the variable attenuator in the input of the vodas transmitting branch being associated with different resistance portions of the variable attenuation means in said second path in such manner that when the common control arms of these switches are moved so as to increase the insertion loss of the variable attenuator in said one path or of the variable attenuator in said vodas transmitting branch the insertion loss of the variable attenuation means in said second path is decreased by the same amount, and vice versa, and the other variable attenuator is common to the input of said vodas receiving branch and said second path so that increase or decrease of the insertion loss in the input of said vodas receiving branch by the action of the controlling sections of the third switch causes an identical increase or decrease, respectively, of the insertion loss in said second path.

VERL J. HAWKS.

No references cited.